US012602932B2

(12) United States Patent
Datta Gupta et al.

(10) Patent No.: US 12,602,932 B2
(45) Date of Patent: Apr. 14, 2026

(54) SYSTEMS AND METHODS FOR MONITORING USERS EXITING A VEHICLE

(71) Applicant: Ford Global Technologies, LLC, Dearborn, MI (US)

(72) Inventors: Somak Datta Gupta, Novi, MI (US); Mahmoud Yousef Ghannam, Canton, MI (US); Oliver Lei, Windsor (CA)

( * ) Notice: Subject to any disclaimer, the term of this patent is extended or adjusted under 35 U.S.C. 154(b) by 288 days.

(21) Appl. No.: 18/461,675

(22) Filed: Sep. 6, 2023

(65) Prior Publication Data

US 2025/0078522 A1 Mar. 6, 2025

(51) Int. Cl.
| | |
|---|---|
| *G06V 20/58* | (2022.01) |
| *B60W 40/02* | (2006.01) |
| *G06V 40/10* | (2022.01) |

(52) U.S. Cl.
CPC ............. *G06V 20/58* (2022.01); *B60W 40/02* (2013.01); *G06V 40/10* (2022.01); *B60W 2420/403* (2013.01)

(58) Field of Classification Search
None
See application file for complete search history.

(56) References Cited

U.S. PATENT DOCUMENTS

| | | | | |
|---|---|---|---|---|
| 11,195,360 B1 * | 12/2021 | Laranang | ................. | G07C 9/22 |
| 11,474,519 B2 * | 10/2022 | Hicok | ................ | G01C 21/3415 |
| 11,488,073 B2 * | 11/2022 | Leary | ................. | G01C 21/3688 |
| 11,804,131 B2 * | 10/2023 | Vijaya Kumar | .... | B60W 60/001 |

| | | | | |
|---|---|---|---|---|
| 2006/0129309 A1 * | 6/2006 | Alewine | ............ | G06Q 30/0251 |
| | | | | 340/995.14 |
| 2007/0124044 A1 * | 5/2007 | Ayoub | ............. | G08G 1/096811 |
| | | | | 701/1 |
| 2012/0260317 A1 * | 10/2012 | Horstemeyer | ..... | G06Q 30/0267 |
| | | | | 709/204 |
| 2014/0308902 A1 * | 10/2014 | Ricci | ...................... | G06Q 10/00 |
| | | | | 455/66.1 |
| 2014/0309806 A1 * | 10/2014 | Ricci | ...................... | G06F 21/31 |
| | | | | 701/1 |

(Continued)

FOREIGN PATENT DOCUMENTS

| | | | |
|---|---|---|---|
| IN | 202141027244 A | * | 12/2022 |
| JP | 2005284730 A | * | 10/2005 |

(Continued)

OTHER PUBLICATIONS

John H. Mott, et al., Design and Validation of a School Bus Passing Detection System Based on Solid-State Lidar, IEEE Xplore, Apr. 24, 2022, pp. 1-6.

*Primary Examiner* — Delomia L Gilliard
(74) *Attorney, Agent, or Firm* — Joseph Zane; Eversheds Sutherland (US) LLP

(57) ABSTRACT

A vehicle including a detection unit and a processor is disclosed. The detection unit may be configured to detect a presence of a user in the vehicle and in proximity to the vehicle. The processor may be configured to obtain inputs from the detection unit and determine that a predefined condition may be met based on the inputs. The processor may be further configured to generate a virtual zone around the vehicle responsive to determining that the predefined condition may be met. The processor may additionally transmit information associated with the virtual zone to another vehicle responsive to generating the virtual zone.

20 Claims, 5 Drawing Sheets

(56)     References Cited

U.S. PATENT DOCUMENTS

| | | | |
|---|---|---|---|
| 2019/0088148 A1* | 3/2019 | Jacobus | B60W 10/18 |
| 2019/0206255 A1* | 7/2019 | Tao | G08G 1/164 |
| 2019/0265054 A1* | 8/2019 | Laplante | G01C 21/362 |
| 2020/0207343 A1* | 7/2020 | Vassilovski | G08G 1/167 |
| 2020/0408531 A1* | 12/2020 | Leary | G05D 1/0278 |
| 2021/0065551 A1* | 3/2021 | Manohar | G08G 1/167 |
| 2021/0225162 A1* | 7/2021 | Tao | G08G 1/0145 |
| 2021/0248704 A1* | 8/2021 | Wang | G06Q 50/40 |
| 2025/0078522 A1* | 3/2025 | Datta Gupta | G06V 20/58 |

FOREIGN PATENT DOCUMENTS

| | | | | |
|---|---|---|---|---|
| JP | 2019082877 A | * | 5/2019 | |
| WO | WO-2019078866 A1 | * | 4/2019 | H04N 23/90 |

* cited by examiner

502  Start

504  Obtain inputs from a detection unit

506  Determine that a predefined condition is met

508  Generate a virtual zone around a vehicle

510  Transmit information associated with the virtual zone to another vehicle

512  Stop

SYSTEMS AND METHODS FOR MONITORING USERS EXITING A VEHICLE

FIELD

The present disclosure relates to systems and methods for monitoring users exiting a vehicle and more particularly to systems and methods for monitoring children exiting a school bus and informing nearby vehicles of the presence of children.

BACKGROUND

School buses provide convenient transportation means for young users (e.g., children) from their homes to the school and back. While transporting children, school bus operators typically implement a number of measures to ensure that the children conveniently reach the school or their homes without any discomfort. For example, a school bus operator may flash stop lights of the bus to notify passersby in proximity to the bus about the presence of children when the children may be entering or exiting the bus. The school bus operator may further audibly notify the passersby about the presence of children.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
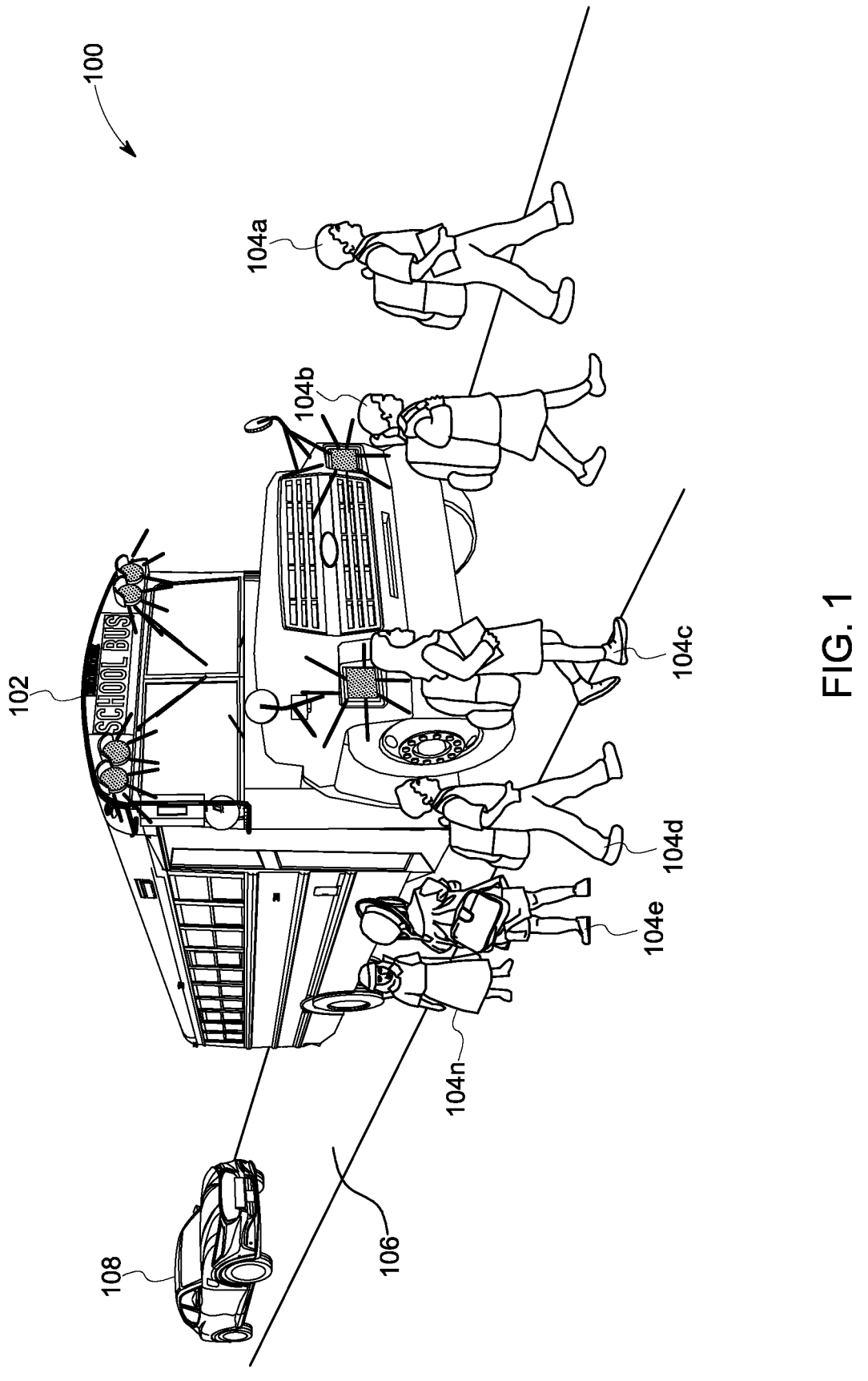
FIG. 1 depicts an example environment in which techniques and structures for providing the systems and methods disclosed herein may be implemented.

The present disclosure describes a vehicle configured to monitor movement of a plurality of users inside and outside the vehicle and notify other vehicles about the presence of the users. Specifically, the present disclosure describes a school bus that may be configured to monitor movement of a plurality of children exiting the bus and crossing a road or an intersection and notifying other vehicles in proximity to the bus about the presence of children. The vehicle may be configured to obtain images of the users from vehicle interior and exterior cameras when the users exit the vehicle, e.g., when the vehicle stops at a bus stop. Responsive to the vehicle stopping at the bus stop and/or at least one user exiting the vehicle, the vehicle may generate a virtual zone around or surrounding the vehicle. Virtual zone dimensions may be based on vehicle dimensions, dimensions (e.g., width) of the road where the vehicle may be located, expected time duration required by the users to cross the road (and an expected average user walking speed), and/or the like. Responsive to generating the virtual zone, the vehicle may transmit information associated with the virtual zone to one or more other vehicles in proximity to the vehicle.

In some aspects, the information associated with the virtual zone may include virtual zone size and dimensions, an associated expiration time duration, and/or the like. The other vehicles may receive the information and may display the information at respective Human-Machine Interfaces (HMIs). Drivers associated with the other vehicles may then view the information on the HMI and stop movement of their respective vehicles. The virtual zone dimensions may indicate to the drivers that the respective vehicles should not enter the virtual zone, till the virtual zone is being displayed on the HMIs. In some aspects, the virtual zone may disappear from the HMI after the lapse of the expiration time duration. At this point, the other vehicles may resume their respective movements.

In other aspects, the vehicle may track movement of each user as the users exit the vehicle by using the images obtained from the vehicle interior and exterior cameras and may cause the HMI to remove the virtual zone when each user may have crossed the road or exited the virtual zone. In further aspects, the vehicle may track movement of each user by determining location of user devices (that may be communicatively coupled with the vehicle) associated with each user. The vehicle may be further configured to broadcast the determined location of each user device (and hence the associated user) to a plurality of additional vehicles that may be located in a geographical area where the users may be located. The vehicle may broadcast the location of each user device either directly to the plurality of additional vehicles via vehicle-to-vehicle (V2V) communication, or indirectly via a server or a connected infrastructure (e.g., by using vehicle-to-infrastructure (V2I) or vehicle-to-everything (V2X) communication).

The present disclosure discloses a vehicle or a school bus that notifies other vehicles about children's presence in proximity to the bus, thereby enabling the children to conveniently exit the bus and/or cross a road or an intersection. Further, the vehicle broadcasts location of each child to a plurality of vehicles in a geographical area where the children may be present, so that drivers of these vehicle may be aware of children's presence and hence drive cautiously.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 (e.g., a first vehicle), which may be, for example, a school bus, a transit bus, a shuttle, and/or the like. The vehicle 102 may be a manually driven vehicle and/or may be configured to operate in a partially or fully autonomous mode. The vehicle 102 may be configured to transport a plurality of users 104a, 104b, 104c, 104d, 104e, 104n (collectively referred to as users 104) from one location to another. The users 104 may be, for example, school children, and the vehicle 102 may transport the users 104 from respective bus stops/homes to the school and back. In the exemplary aspect depicted in FIG. 1, the users 104 are shown as exiting the vehicle 102 and crossing a road 106.

In some aspects, the vehicle 102 may implement a plurality of measures to ensure users' convenience while entering or exiting the vehicle 102 and/or while crossing the road 106. For example, the vehicle 102 may illuminate or flash one or more vehicle exterior lights (e.g., stop lights, rear lights, front lights, and/or the like) for a predefined time duration, when the vehicle 102 stops at a bus stop and the users 104 begin to exit the vehicle 102. Flashing of vehicle exterior lights may provide an indication to other vehicles (e.g., a second vehicle 108, as shown in FIG. 1) in proximity to the vehicle 102 to stop and let the users 104 conveniently exit the vehicle 102 and/or cross the road 106.

In further aspects, the vehicle 102 may include a notification system (shown as notification system 214 in FIG. 2) that may implement additional measures to enable the users 104 to conveniently exit the vehicle 102 and/or cross the road 106. When the vehicle 102 stops at the bus stop, the notification system ("system") may first determine a count of users 104 exiting the vehicle 102 by using inputs obtained from a vehicle detection unit (shown as detection unit 242 in FIG. 2). The detection unit may be, for example, vehicle interior and exterior cameras, and the inputs obtained from the detection unit may include images captured by the vehicle interior and exterior cameras. In addition, when the vehicle 102 stops at the bus stop, the system may generate a virtual zone (shown as virtual zone 302 in FIGS. 3A and 3B) around the vehicle 102. In an exemplary aspect, the system may generate the virtual zone on a digital map of a geographical area where the vehicle 102 may be located. In some aspects, virtual zone dimensions may depend on the dimensions of the vehicle 102, the road 106, and/or the like. In other aspects, the virtual zone dimensions may be preset.

Responsive to determining the count of users 104 and generating the virtual zone, the system may transmit information associated with the virtual zone to one or more vehicles (e.g., the second vehicle 108) that may be located in proximity to the vehicle 102. The system may transmit the information associated with the virtual zone to the second vehicle 108 directly via vehicle-to-vehicle (V2V) communication, or indirectly via a server (e.g., by using cellular communication) and/or a connected infrastructure (e.g., a connected lamppost or any other connected infrastructure, using vehicle-to-infrastructure (V2I) or vehicle-to-everything (V2X) communication). The information associated with the virtual zone may include the virtual zone dimensions, an expiration time duration associated with the virtual zone, and/or the digital map (e.g., when the virtual zone may be generated on the digital map).

Responsive to the system transmitting the information associated with the virtual zone, the second vehicle 108 may receive the information. The second vehicle 108 may then display the virtual zone (on the digital map or otherwise) on a human-machine interface (HMI) associated with the second vehicle 108. A driver associated with the second vehicle 108 may view the virtual zone on the HMI and may receive an indication (from viewing the virtual zone) that the users 104 may be exiting the vehicle 102 and/or crossing the road 106, and hence the second vehicle 108 should stop and not enter the virtual zone. In some aspects, the expiration time duration may be associated with a time duration for which the virtual zone may be visible on the HMI associated with the second vehicle 108. The expiration time duration may be same as or different from the predefined time duration described above for which the vehicle 102 may flash vehicle exterior lights. In some aspects, the expiration time duration may depend on an expected time duration the users 104 may take to exit the vehicle 102 and cross the road 106 and may depend on vehicle and road dimensions.

The present disclosure is not limited to the presence of expiration time duration in the information associated with the virtual zone. In some aspects, the HMI associated with the second vehicle 108 may continue to display the virtual zone till the second vehicle 108 continues to receive the information associated with the virtual zone from the system. In this case, the system may continue to transmit the information to the second vehicle 108 till the system determines that all the users 104 may have crossed the road 106 and/or exited the virtual zone based on the inputs obtained from the detection unit and the determined count of users 104. Responsive to determining that all the users 104 may have crossed the road 106 and/or exited the virtual zone, the system may deactivate transmission of the information to the second vehicle 108, at which point the HMI associated with the second vehicle 108 may stop displaying the virtual zone. When the HMI associated with the second vehicle 108 stops displaying the virtual zone, a second vehicle driver may get an indication that the driver may now drive the second vehicle 108. In this manner, the system enables the users 104 to conveniently exit the vehicle 102 and/or cross the road 106, without encountering any interference from one or more vehicles (e.g., the second vehicle 108) that may be located in proximity to the vehicle 102.

In further aspects, the system may be communicatively coupled with user devices associated with the users 104. The system may "track" real-time location of each user 104 by determining real-time location of respective user devices relative to the vehicle 102 and may broadcast the real-time location of each user 104 to the second vehicle 108 and one or more additional vehicles that may be located in the geographical area where the vehicle 102 or the users 104 may be located, but may not be in proximity to the vehicle 102. In some aspects, the vehicle 102 may broadcast the real-time location of each user 104 to the second vehicle 108 and the additional vehicles directly via V2V communication, or indirectly via the server and/or the connected infrastructure (e.g., via V2I/V2X communication). The system may continue to broadcast the real-time location of each user 104 for a predefined broadcast time duration even after the users 104 may have crossed the road 106 or exited the virtual zone. The real-time location of each user 104 may provide an indication to the drivers associated with the second vehicle 108 and the additional vehicles that the users 104 may be nearby in the geographical area, and hence the drivers may drive respective vehicles cautiously.

In some aspects, the system may itself broadcast the real-time location of each user 104 for the predefined broadcast time duration, as described above. In other aspects, the system may transmit the real-time location of each user 104 to the server and/or the infrastructure, and the server and/or the infrastructure may broadcast the real-time location to the second vehicle 108 and the additional vehicles. In some aspects, one or more of the additional vehicles may be parents' vehicles of one or more users.

Further details of the system are described below in conjunction with FIG. 2.

The vehicle 102 and the notification system implement and/or perform operations, as described here in the present disclosure, in accordance with the owner manual and safety guidelines. In addition, any action taken by the vehicle operator and/or drivers associated with the second vehicle 108 and/or the additional vehicles based on recommendations or notifications provided by the vehicle 102 and/or the notification system should comply with all the rules specific to the location and operation of respective vehicles (e.g., Federal, state, country, city, etc.). The recommendation or notifications, as provided by the vehicle 102 and/or the notification system should be treated as suggestions and only followed according to any rules specific to the location and operation of respective vehicles.

Figure 2:
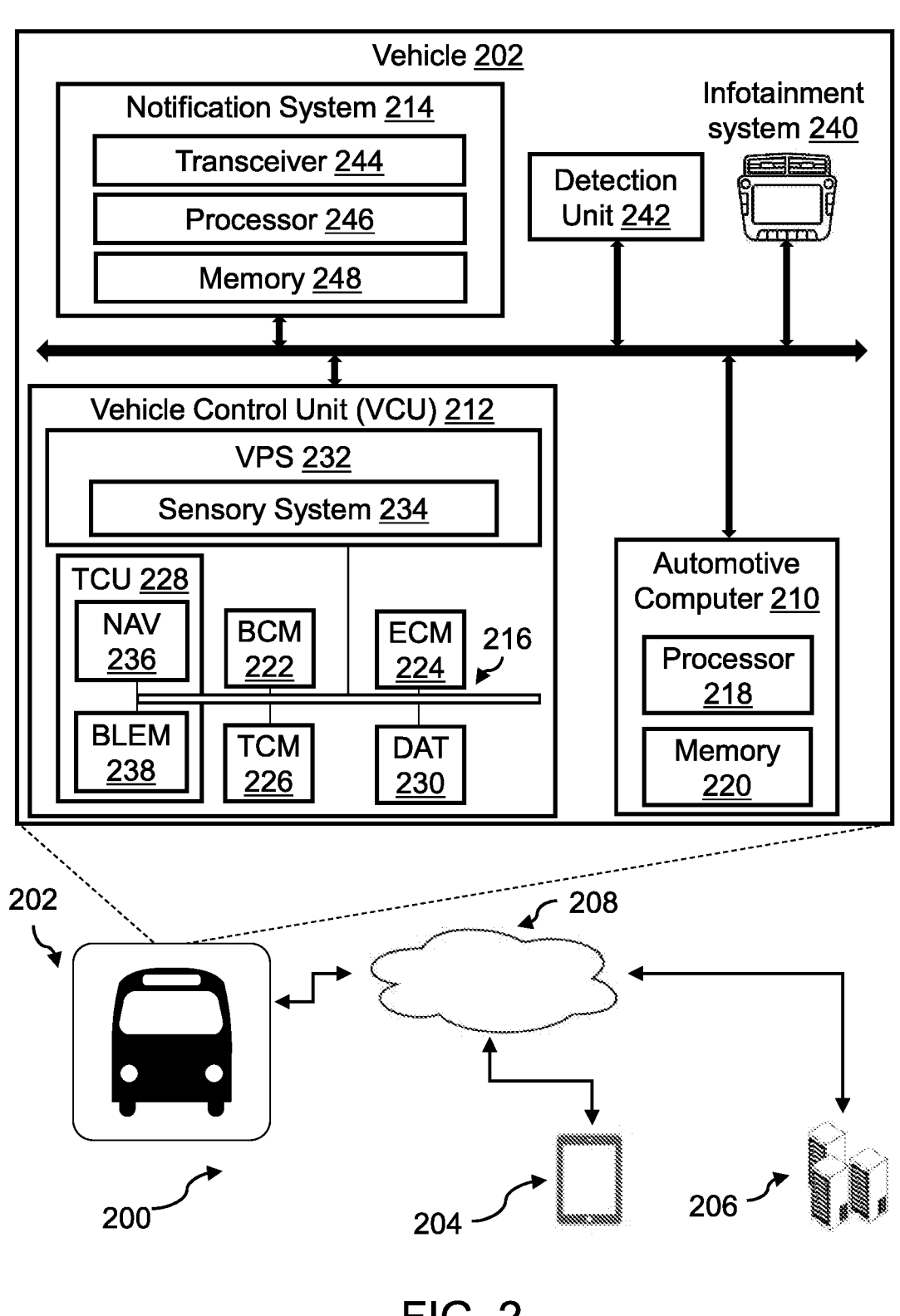
FIG. 2 depicts a block diagram of an example system for monitoring a plurality of users associated with a vehicle in accordance with the present disclosure.

FIG. 2 depicts a block diagram of an example system 200 for monitoring the users 104 associated with a vehicle 202 in accordance with the present disclosure. The vehicle 202 may be same as the vehicle 102 described above. While describing FIG. 2, references will be made to FIGS. 3A, 3B and 4.

The system 200 may include the vehicle 202, one or more user devices 204 and one or more servers 206 communicatively coupled with each other via one or more networks 208. The user devices 204 may be associated with the users 104. Although FIG. 2 depicts a single user device 204, the vehicle 202 may be communicatively coupled with a plurality of user devices 204, and each user device 204 may be associated with each user 104. The user device 204 may be, for example, a mobile phone, a laptop, a computer, a tablet, a wearable device, or any other similar device with communication capabilities.

The server(s) 206 may be part of a cloud-based computing infrastructure and may be associated with and/or include a Telematics Service Delivery Network (SDN) that provides digital data services to the vehicle 202 and other vehicles (e.g., the second vehicle 108 and the additional vehicles described above, not shown in FIG. 2). In further aspects, the server(s) 206 may be associated with a navigation services firm and may be configured to provide a digital map of a geographical area where the vehicle 202 may be located, to the vehicle 202. The server(s) 206 may be further configured to store a mapping of each user device 204 (e.g., an identifier of each user device 204) with information associated with each user 104, e.g., user's name, contact details, home address, bus stop location, and/or the like. The server(s) 206 may be configured to transmit the mapping to the vehicle 202 at a predefined frequency, or when the vehicle 202 transmits a request to the server(s) 206 to obtain the mapping. In additional aspects, the server(s) 206 may be configured to store expected travel/movement path of each user 104 when the user 104 exits the vehicle 202 and may transmit information associated with the expected path of each user 104 to the vehicle 202 at a predefined frequency or when the vehicle 202 transmits a request to the server(s) 206 to obtain the information. In some aspects, the server(s) 206 may be configured to predict the expected path of each user 104 based on historical user's travel/movement patterns, user inputs, calendar events, user's past usage/availability of public transport or shared mobility solutions, user reservations of public transport or shared mobility solutions, and/or the like. In other aspects, the vehicle 202 may itself predict the expected path of each user 104 based on the parameters described above. In further aspects, each user device 204 may be associated with each user's vehicle. In this case, the vehicle 202 may use last known location of each user's vehicle to predict expected path of each user.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a notification system 214 (or system 214). The VCU 212 may include a plurality of Electronic Control Units (ECUs) 216 disposed in communication with the automotive computer 210.

The user device 204 may connect with the automotive computer 210 and/or the system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques. In some aspects, the automotive computer 210 and/or the system 214 may determine presence of the user device 204 in proximity to the vehicle 202 or in the vehicle 202 by measuring Received Signal Strength Indicator (RSSI) value associated with the user device 204 when the user device 204 connects with the vehicle 202 via, for example, Bluetooth® or BLE. In an exemplary aspect, if the measured RSSI value may be greater than a predefined threshold, the automotive computer 210 and/or the system 214 may determine that the user device 204 may be in proximity to the vehicle 202 or in the vehicle 202.

In some aspects, the automotive computer 210 and/or the system 214 may be installed anywhere in the vehicle 202, in accordance with the disclosure. Further, the automotive computer 210 may operate as a functional part of the system 214. The automotive computer 210 may be or include an electronic vehicle controller, having one or more processor(s) 218 and a memory 220. Moreover, the system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable storage medium or memory storing a notification program code. The memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 may include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, inertial measurement unit (IMU), etc. The vehicle interior and exterior cameras may be configured to capture user images inside and outside the vehicle 202.

In some aspects, the VCU 212 may control vehicle operational aspects and implement one or more instruction sets received from the server(s) 206, from one or more instruction sets stored in the memory 220, including instructions operational as part of the system 214.

The TCU 228 may be configured and/or programmed to provide vehicle connectivity to wireless computing systems onboard and off board the vehicle 202 and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2, the server(s) 206, the user device 204, etc.), computers, and modules. The TCU 228 may be disposed in communication with the ECUs 216 by way of a bus. In some aspects, the TCU 228 may be configured to determine a real-time vehicle geolocation, e.g., via the NAV receiver 236. Further, the TCU 228 may enable the user device 204 to communicatively couple with the vehicle 202 via the BLEM 238.

The ECUs 216 may control aspects of vehicle operation and communication using inputs from human drivers, inputs from the automotive computer 210, the system 214, and/or via wireless signal inputs received via the wireless connection(s) from other connected devices, such as the server(s) 206, among others.

The BCM 222 generally includes integration of sensors, vehicle performance indicators, and variable reactors associated with vehicle systems and may include processor-based power distribution circuitry that may control functions associated with the vehicle body such as lights (e.g., stop lights, rear lights, front lights, interior lights, etc.), windows, security, camera(s), audio system(s), speakers, wipers, door locks and access control, various comfort controls, etc. The BCM 222 may also operate as a gateway for bus and network interfaces to interact with remote ECUs (not shown in FIG. 2).

The DAT controller 230 may provide Level-1 through Level-3 automated driving and driver assistance functionality that may include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240. The infotainment system 240 may include a touchscreen interface portion and may include voice recognition features, biometric identification capabilities that may identify users based on facial recognition, voice recognition, fingerprint identification, or other biological identification means. In other aspects, the infotainment system 240 may be further configured to receive user instructions via the touchscreen interface portion and/or output or display notifications, navigation maps, tour information, etc. on the touchscreen interface portion.

In some aspects, the vehicle 202 may further include a detection unit 242. The detection unit 242 may be part of the vehicle sensory system 234, or may be separate from the vehicle sensory system 234. In some aspects, the detection unit 242 may include interior and exterior vehicle cameras and may be configured to detect user presence in the vehicle 202 or in proximity to the vehicle 202 by capturing their images. In other aspects, the detection unit 242 may be radar sensors (and/or lidar sensors) configured to detect user presence in the vehicle 202 or in proximity to the vehicle 202 by using radio waves. In further aspects, the detection unit 242 may include infrared sensors, sound-based sensors, user-device locators, and/or the like. When the detection unit 242 includes user-device locators, the detection unit 242 may be configured to determine the location of the user device associated with each user 104 relative to the vehicle 202. Furthermore, accuracy of the detection unit 242 may be enhanced by using any combination of the sensors described above and Artificial Intelligence (AI) based analysis. In additional aspects, the detection unit 242 may obtain inputs from sensors off-board the detection unit 242, e.g., sensors located on road infrastructure.

The computing system architecture of the automotive computer 210, the VCU 212, and/or the system 214 may omit certain computing modules. It should be readily understood that the computing environment depicted in FIG. 2 is an example of a possible implementation according to the present disclosure, and thus, it should not be considered as limiting or exclusive.

In accordance with some aspects, the system 214 may be integrated with and/or executed as part of the ECUs 216. The system 214, regardless of whether it is integrated with the automotive computer 210 or the ECUs 216, or whether it operates as an independent computing system in the vehicle 202, may include a transceiver 244, a processor 246, and a computer-readable memory 248.

The transceiver 244 may be configured to receive information/inputs from one or more external devices or systems, e.g., the user device 204, the server(s) 206, and/or the like, via the network 208. For example, the transceiver 244 may be configured to receive the mapping of each user device 204 (e.g., the identifier of each user device 204) with the information associated with each user 104, the digital map of a geographical area where the vehicle 202 may be located, the expected path of each user 204, etc. from the server(s) 206. Further, the transceiver 244 may transmit notifications, requests, signals, etc. to the external devices or systems. In addition, the transceiver 244 may be configured to receive information/inputs from vehicle components such as the detection unit 242, the vehicle sensory system 234, one or more ECUs 216, and/or the like. Further, the transceiver 244 may transmit signals (e.g., command signals) or notifications to the vehicle components such as the BCM 222, and/or the like.

The processor 246 and the memory 248 may be same as or similar to the processor 218 and the memory 220, respectively. In some aspects, the processor 246 may utilize the memory 248 to store programs in code and/or to store data for performing aspects in accordance with the disclosure. The memory 248 may be a non-transitory computer-readable storage medium or memory storing the notification program code. In some aspects, the memory 248 may additionally store instructions/information/data obtained from the server(s) 206, the user device 204, and/or the like.

In operation, the processor 246 may obtain inputs from the detection unit 242 at a predefined frequency or when the vehicle 202 stops moving (e.g., when the vehicle 202 stops at a bus stop). The processor 246 may determine that the vehicle 202 may have stopped moving based on inputs obtained from the VCU 212. In some aspects, the inputs obtained from the detection unit 242 may include images of the users 104 captured by the vehicle interior and/or exterior cameras. Responsive to obtaining the inputs obtained from the detection unit 242, the processor 246 may execute one or more image processing algorithms (that may be pre-stored in the memory 248) to determine that a predetermined condition may be met based on the inputs obtained from the detection unit 242. In some aspects, the predefined condition may be met when the processor 246 determines that at least one user, from the users 104, may have exited the vehicle 202.

Responsive to determining that the predefined condition may be met or when the vehicle 202 stops moving, the processor 246 may transmit a command signal to the BCM 222 to cause activation/flashing of one or more exterior vehicle lights (e.g., stop lights, rear lights, front lights, and/or the like) for a predefined time duration, as described above in conjunction with FIG. 1. Flashing of vehicle exterior lights may provide an indication to other vehicles in proximity to the vehicle 202 to stop and let the users 104 conveniently exit the vehicle 202 and/or cross the road 106. Further, responsive to determining that the predefined condition may be met, the processor 246 may determine a count of users 104 who may have exited the vehicle 202 based on the inputs (e.g., user images) obtained from the detection unit 242. For example, the processor 246 may determine that six users (e.g., the users 104a, 104b, 104c, 104d, 104e, 104n) may have exited the vehicle 202 based on the images obtained from the vehicle interior and exterior cameras.

Figure 3A:
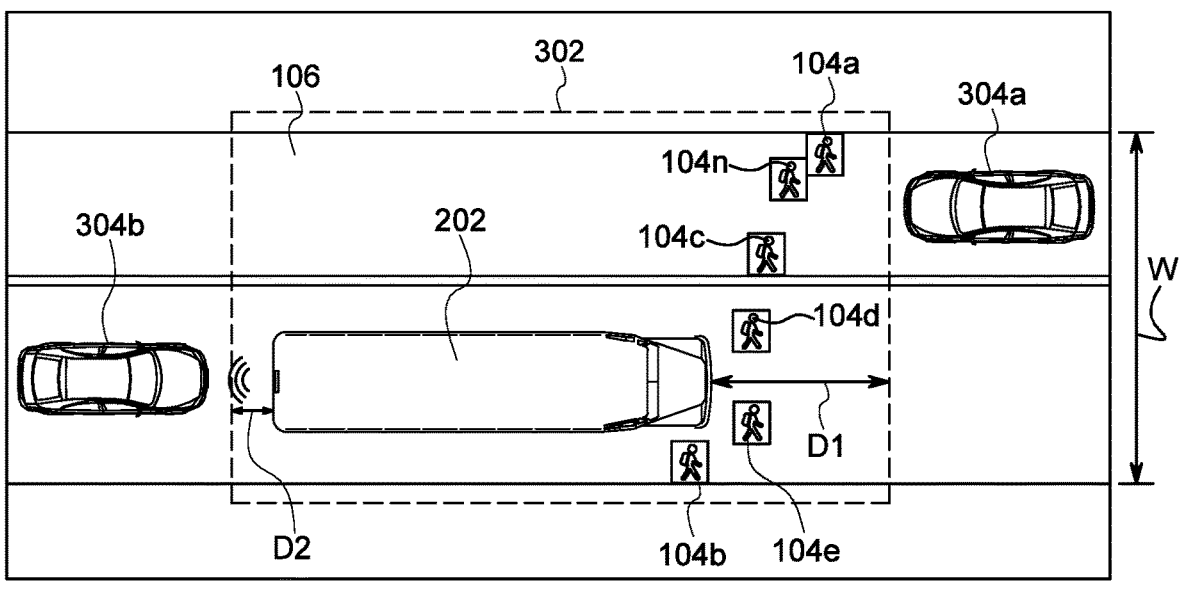
FIGS. 3A and 3B depict example views of a plurality of users in proximity of a vehicle in accordance with the present disclosure.
Figure 3B:
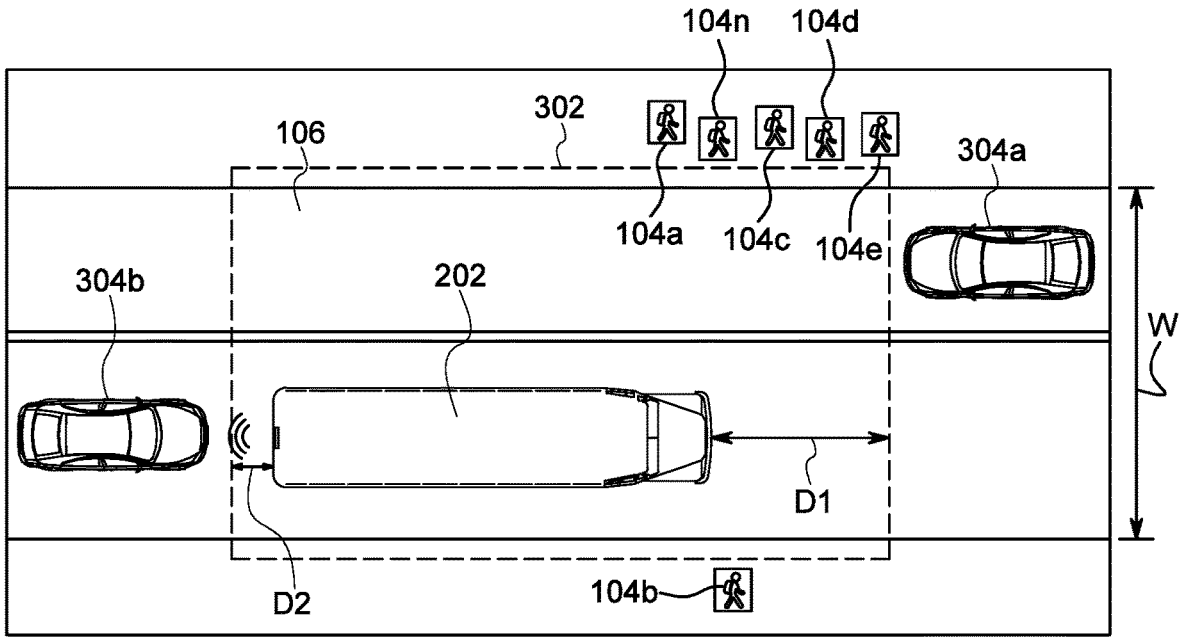
Figure 4:
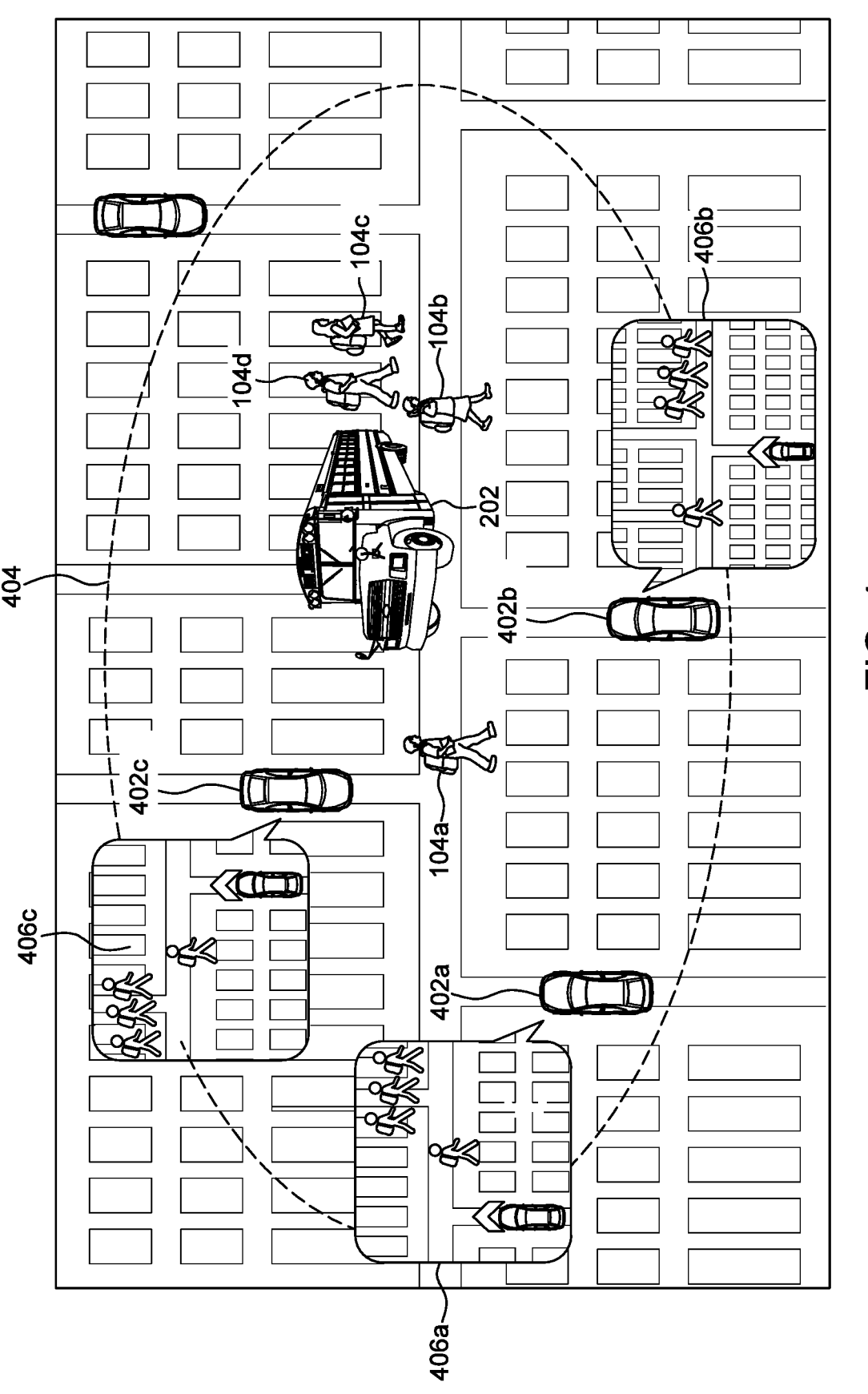
FIG. 4 depicts an example view of a plurality of vehicles and a plurality of users located in a geographical area in accordance with the present disclosure.

Responsive to determining that the predefined condition may be met and the count of users 104 who may have exited the vehicle 202, the processor 246 may generate a virtual zone 302 around or surrounding the vehicle 202, as shown in FIGS. 3A and 3B. In some aspects, the virtual zone dimensions may depend on the dimensions of the vehicle 202, the road 106, the count of users 104, and/or the like. For example, the virtual zone 302 may be of greater dimension when the count of users 104 may be high and/or the road 106 may have a large width. On the other hand, the virtual zone 302 may be of relatively lower dimension when the count of users 104 may be lower and/or the road 106 may have a smaller width. In other aspects, the virtual zone dimensions may be preset (and stored in the memory 248).

The virtual zone 302 may be of any shape. In the exemplary aspect depicted in FIGS. 3A and 3B, the virtual zone 302 is of rectangular shape; however, in other aspects, the virtual zone 302 may be shaped as a circle, an ellipse, etc. The arrangement of the virtual zone 302 relative to the vehicle 202 may depend on the road dimensions and vehicle location on the road 106. In an exemplary aspect, the processor 246 may generate and arrange the virtual zone 302 around the vehicle 202 such that the virtual zone 302 may cover an entire area of vehicle 202. Further, front and rear edges of the virtual zone 302 may be disposed at a first predefined distance "D1" from a vehicle front portion and a second predefined distance "D2" from a vehicle rear portion, respectively. Further, left and right edges of the virtual zone 302 may be disposed at or slightly away from the edges of the road 106, such that the virtual zone 302 may cover an entire road width "W", as shown in FIG. 3A. Although "D1" is depicted as being greater than "D2" in FIG. 3A, the present disclosure is not limited to such an arrangement of the virtual zone 302 around the vehicle 202. In some aspects, the distance "D1" may be equivalent to or less than the distance "D2". The distances "D1" and "D2" may depend on a plurality of factors, e.g., the count of users 104, vehicle dimensions, the expected path of travel/movement of each user 104, and/or the like.

Further, as described above in conjunction with FIG. 1, the virtual zone 302 may be associated with an expiration time duration. The concept of expiration time duration associated with the virtual zone 302 is already described above. In some aspects, the expiration time duration may depend on the dimensions of the vehicle 202, the road 106, the count of users 104, an expected time duration one or more users from the plurality of users 104 may take to cross the road 106, the expected path of travel/movement of each user 104, the expected movement speed of each user 104, and/or the like. For example, the expiration time duration may be greater when the count of users 104 may be more and/or the width "W" may be large, and the expiration time duration may be relatively lesser when the count of users 104 may be less and/or the width "W" may be small. In other aspects, the expiration time duration may be preset (and stored in the memory 248).

As described above in conjunction with FIG. 1, in some aspects, the processor 246 may generate the virtual zone 302 on a digital map of a geographical area where the vehicle 202 may be located. In some aspects, the processor 246 may first fetch the digital map of the geographical area from the server(s) 206 and then generate the virtual zone 302 on the digital map. In other aspects, the processor 246 may not generate the virtual zone 302 on the digital map. Stated another way, virtual zone generation is not dependent on the availability of the digital map, and the processor 246 may generate the virtual zone 302 without the digital map as well.

Responsive to generating the virtual zone 302, the processor 246 may transmit, via the transceiver 244, information associated with the virtual zone 302 to one or more other vehicles 304a, 304b (as shown in FIGS. 3A and 3B) that may be located in proximity to the vehicle 202. The information associated with the virtual zone 302 may include, but is not limited to, virtual zone shape and dimensions, associated expiration time duration, the digital map (if the virtual zone 302 is generated on a digital map), and/or the like. As described above in conjunction with FIG. 1, the processor 246 may transmit, via the transceiver 244, the information directly to the other vehicles 304a, 304b via V2V communication, or indirectly via the server(s) 206 and/or a connected infrastructure via cellular communication, V2V or V2X communication. In the case of indirect information transmission to the other vehicles 304a, 304b, the processor 246 may first transmit the information to the server(s) 204/connected infrastructure, which may then transmit the information to the other vehicles 304*a*, 304*b*.

As described above in conjunction with FIG. 1, HMI associated with the other vehicles 304*a*, 304*b* may display the virtual zone 302 (on the digital map or otherwise) responsive to receiving the information from the processor 246 (directly or via the server(s) 206/connected infrastructure). Drivers associated with the other vehicles 304*a*, 304*b* may view the virtual zone 302 on respective HMI screens when the virtual zone 302 starts getting displayed. When the virtual zone 302 starts getting displayed on the HMI screens, the drivers may receive an indication that they should stop their vehicles in proximity to the beginning of the boundary of the virtual zone 302 and not enter the virtual zone 302 until the virtual zone 302 is being displayed on the HMI screens or until the processor 246 continues to transmit the information associated with the virtual zone 302. If one or both of the vehicles 304*a*, 304*b* are autonomous vehicles, the vehicles 304*a*, 304*b* may automatically stop in proximity to the beginning of the boundary of the virtual zone 302 when the vehicles 304*a*, 304*b* receive the information associated with the virtual zone 302 from the processor 246. In this case, the vehicles 304*a*, 304*b* may automatically determine the boundary of the virtual zone 302 based on the received information and may autonomously control vehicle movement such that the vehicles 304*a*, 304*b* do not enter the virtual zone 302 until the processor 246 continues to transmit the information associated with the virtual zone 302.

In addition to transmitting (directly or indirectly) the information associated with the virtual zone 302 to the other vehicles 304*a*, 304*b*, the processor 246 may "monitor" movement of each user 104 based on the inputs obtained from the detection unit 242/the images obtained from the vehicle exterior cameras. By monitoring user movement, the processor 246 may determine whether each user 104 may have conveniently crossed/exited the road 106. Specifically, based on the inputs obtained from the detection unit 242 and the count of users 104, the processor 246 may determine whether each user 104 has travelled a predefined distance away from the vehicle 202, or has crossed or exited the road 106, or has exited the virtual zone 302. In some aspects, the processor 246 may determine that the user 104 may have travelled the predefined distance away from the vehicle 202 when the user 104 exits the virtual zone 302, from either the left or the right edge of the virtual zone 302 (which may be parallel to the road edges).

Responsive to determining that each user 104 may not have exited the virtual zone 302, the processor 246 may continue to transmit the information associated with the virtual zone 302 to the other vehicles 304*a*, 304*b*, and the other vehicles 304*a*, 304*b* may continue to wait/not move (as their respective HMI screens may still be displaying the virtual zone 302). On the other hand, responsive to determining that each user 104 has travelled the predefined distance away from the vehicle 202, or has crossed or exited the road 106, or has exited the virtual zone 302 (as shown in FIG. 3B), the processor 246 may deactivate the transmission of the information associated with the virtual zone 302 to the other vehicles 304*a*, 304*b*, which may cause their respective HMI screens to remove or stop displaying the virtual zone 302. When the HMI screens associated with the vehicles 304*a*, 304*b* stop displaying the virtual zone 302, respective drivers of these vehicles may get an indication that the vehicles 304*a*, 304*b* may move. If the vehicles 304*a*, 304*b* are autonomous vehicles, the vehicles 304*a*, 304*b* may automatically commence vehicle movement when the processor 246 deactivates the transmission of the information associated with the virtual zone 302 to the vehicles 304*a*, 304*b*. In this manner, the processor 246 may ensure that the other vehicles 304*a*, 304*b* do not move and enter the virtual zone 302 until all the users 104 may have exited the virtual zone 302 or the road 106, thereby enabling the users 104 to conveniently cross or exit the road 106.

In further aspects, the processor 246 may monitor movement of each user 104 even after the users 104 exit the virtual zone 302 based on the inputs obtained from the detection unit 242. In this case, the processor 246 may determine location of each user 104 relative to the vehicle 202 based on the images captured by the vehicle exterior cameras and may transmit (via the transceiver 244) the determined location of each user 104 to the other vehicle 304*a*, 304*b* (and additional vehicles that may be in proximity to the vehicle 202). Drivers associated with the other vehicle 304*a*, 304*b* may view the location of each user 104 on respective HMI screens and may maneuver respective vehicle movement based on the location of each user 104. For example, the drivers may slow vehicle speed when one or more users 104 may be in proximity to their vehicles, as determined by viewing the location of each user 104 on the HMI screens. If the vehicles 304*a*, 304*b* are autonomous vehicles, the vehicles 304*a*, 304*b* may automatically control vehicle movement based on the location of each user 104 received from the transceiver 244.

Although the description above describes an aspect where the processor 246 determines the location of each user 104 based on the images captured by the vehicle exterior cameras, in additional aspects, the processor 246 may determine the location of each user 104 based on a real-time location of the user device 204 associated with each user 104 relative to the vehicle 202. In some aspects, the processor 246 may determine real-time location of the user device 204 associated with each user 104 based on inputs obtained from the user device locator that may be part of the detection unit 242.

In some aspects, when each user 104 boards or enters the vehicle 202 (e.g., at the school), the vehicle 202 may communicatively couple with each user device 204 via the BLEM 238. Responsive to communicatively coupling with each user device 204, the vehicle 202/processor 246 may obtain an identifier of each user device from respective user device. The processor 246 may further obtain the mapping of each user device 204 (specifically the identifier of each user device 204) with the information associated with each user 104 from the server(s) 206 to determine the information associated with each user 104. For example, the processor 246 may determine names, bus stop locations, etc. of each user 104 who may be present in the vehicle 202, responsive to communicatively coupling with the user devices 204 and obtaining the mapping, as described above.

When the users 104 exit (or de-board) the vehicle 202, the processor 246 may determine real-time location of each user device 204 (since each user device 204 may be already communicatively coupled with the vehicle 202, as described above), in a geographical area where the vehicle 202 may be located, relative to the vehicle 202 when each user 104 moves away from the virtual zone 302. In some aspects, the processor 246 (or the detection unit 242) may determine the real-time location of each user device 204 by calculating a distance and direction of each user device 204 relative to a vehicle real-time geolocation (that the processor 246 may obtain from the NAV receiver 236).

Responsive to determining the real-time location of each user device 204 (and hence each associated user 104), the processor 246 may transmit/broadcast the location of each user device 204/user 104 to a plurality of vehicles 402*a*, 402b and 402c (shown in FIG. 4) that may be located in a geographical area 404 in proximity to the vehicle 202. Geographical area dimensions may be predetermined and may be pre-stored in the memory 248.

In some aspects, the geographical area 404 may be the area where the users 104 may be expected to be or travel/walk (as determined based on the expected path associated with each user 104 that the vehicle 202 may obtain from the server(s) 206 or itself predict, as described above), when the users 104 exit the virtual zone 302. For example, the geographical area 404 may include the area that each user 104 may travel to reach to their respective homes from the bus stop as determined from the expected path associated with each user 104. Further, the plurality of vehicles 402a, 402b, and 402c may be those vehicles that may be present in the geographical area 404. In some aspects, one or more vehicles of the vehicles 402a, 402b, and 402c may be located at a distance from the vehicle 202 (e.g., at other streets), such that respective drivers of these vehicles may not be able to directly see/view the users 104. Responsive to receiving the location of each user 104 from the processor 246, respective HMI screens of the plurality of vehicles 402a, 402b, and 402c may display the received user locations, thereby enabling respective drivers to view the location of each user 104 even if the drivers are not able to directly see the users 104. Responsive to viewing the location of each user 104, the drivers may maneuver respective vehicle movement (or vehicles may autonomously maneuver vehicle movement if the vehicles are autonomous vehicles), thereby enabling convenient movement of each user 104 in the geographical area, even after the users 104 exit the virtual zone 302. In some aspects, the respective HMI screens of the plurality of vehicles 402a, 402b, and 402c may display the location of each user 104 relative to the vehicle receiving the user location, thus enabling the drivers to conveniently view location of each user 104 relative to their own vehicles. For example, as shown in view 406a, HMI associated with the vehicle 402a displays user location relative to the vehicle 402a. Similarly, as shown in views 406b and 406c, HMIs associated with the vehicles 402b and 402c display user locations relative to the vehicles 402b and 402c, respectively.

In some aspects, the processor 246/vehicle 202 may broadcast the location of each user device 204/user 104 to the plurality of vehicles 402a, 402b, and 402c directly via V2V communication. In other aspects, the processor 246/vehicle 202 may transmit the location of each user 104 to the server(s) and the connected infrastructure via V2I or V2X communication, and the server(s) and the connected infrastructure may then broadcast the location of each user 104 to the plurality of vehicles 402a, 402b, 402c.

In some aspects, by communicatively coupling with the user devices 204, the processor 246 may be further configured to determine if all the users 104 associated with a bus stop may have exited the vehicle 202 when the vehicle 202 reaches the bus stop. In this case, when the vehicle 202 reaches the bus stop, the processor 246 may determine the identifiers of the user devices 204 associated with the bus stop from the mapping of the identifiers of each user device with the information associated with each user 104. The processor 246 may further track movement of each such user device 204 as the associated user 104 exits the vehicle 202. Responsive to determining that one or more such user devices (and hence associated users) may still be in the vehicle 202 (e.g., when the associated user may have forgotten the bus stop or may be asleep in the vehicle 202) when the vehicle 202 may be about to move from the bus stop, the processor 246 and/or a vehicle operator may audibly notify/alert the user to exit the vehicle 202. In this manner, the processor 246 may prevent the users 104 from missing their respective bus stops.

In additional aspects, the processor 246 may use Artificial Intelligence (AI)/Machine Learning (ML) to track movement of each user 104 (or the user device 204) inside and outside the vehicle 202 based on a plurality of data, including, but not limited to, a presence or absence of a user from the school on a particular day, activity pattern, and/or the like. Further, the processor 246 may use AI/ML (and/or data obtained from the server 206 or cloud) to dynamically train and update the map, boundary, and/or dimensions of the virtual zone 302 around the vehicle 202 based on one or more parameters, including, but not limited to, presence of obstructions or structures (e.g., constructions, blocks, detour, etc.) in proximity to the vehicle 202 and/or the bus stop, time of day, bus stop location, etc. For example, the virtual zone dimensions may be different during school hours or school times on weekdays as compared to weekends.

Further, even though the present disclosure is described by using an example aspect where the vehicle 202 is a school bus and the users 104 are school children, the present disclosure is not limited to such as an aspect. In alternative aspects, the vehicle 202 may be a mobile chair for elders (in this case, the users 104 may be the elders) pushed by another user or driven, vehicles used in senior homes, kindergartens, delivery/construction vehicle with multiple members on board dropped at different locations/sites, public bus, corporate shuttle, without departing from the scope of the present disclosure.

Figure 5:
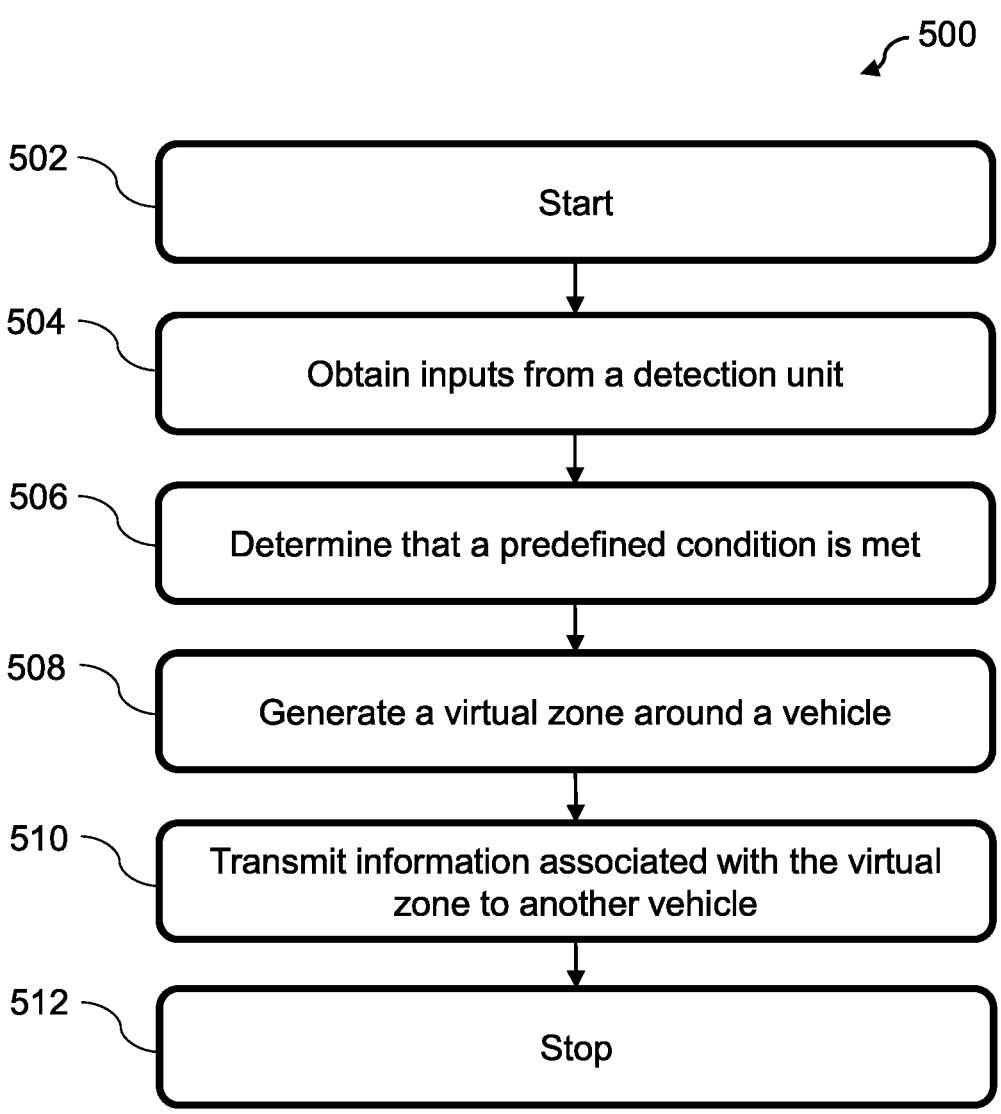
FIG. 5 depicts a flow diagram of an example method for monitoring a user associated with a vehicle in accordance with the present disclosure.

FIG. 5 depicts a flow diagram of an example method 500 for monitoring each user 104 associated with the vehicle 202 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 246, the inputs from the detection unit 242. As described above, the processor 246 may obtain user images captured by the vehicle interior and exterior cameras. At step 506, the method 500 may include determining, by the processor 246, that the predefined condition may be met based on the inputs obtained from the detection unit 242. As described above, the predefined condition may be met when at least one user, from the users 104, may have exited the vehicle 202.

At step 508, the method 500 may include generating, by the processor 246, the virtual zone 302 around or surrounding the vehicle 202 responsive to determining that the predefined condition may be met. At step 510, the method 500 may include transmitting, by the processor 246, the information associated with the virtual zone 302 to the vehicles 304a and 304b.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle comprising:
a detection unit configured to detect a presence of a user in the first vehicle and in proximity to the first vehicle; and
a processor communicatively coupled with the detection unit, wherein the processor is configured to:
obtain inputs from the detection unit;
determine that a predefined condition is met based on the inputs;
obtain a digital map of an area around and including the first vehicle;
generate, using the digital map, a virtual zone around the first vehicle responsive to determining that the predefined condition is met; and
transmit information associated with the virtual zone to a second vehicle responsive to generating the virtual zone, wherein the information associated with the virtual zone includes a shape and dimension of the virtual zone and an expiration time duration associated with the virtual zone, which causes the second vehicle to alter its operation.

2. The first vehicle of claim 1, wherein the detection unit comprises interior and exterior vehicle cameras.

3. The first vehicle of claim 2, wherein the inputs comprise user images captured by the interior and exterior vehicle cameras.

4. The first vehicle of claim 1, wherein the predefined condition is met when the user exits the first vehicle.

5. The first vehicle of claim 1, wherein the processor is further configured to:
determine that the user has travelled a predefined distance away from the first vehicle based on the inputs; and
deactivate transmission of the information associated with the virtual zone to the second vehicle responsive to determining that the user has travelled the predefined distance away from the first vehicle.

6. The first vehicle of claim 5, wherein the processor determines that the user has travelled the predefined distance away from the first vehicle by determining that the user has exited the virtual zone.

7. The first vehicle of claim 1, wherein the processor is further configured to:
determine a user location relative to the first vehicle based on the inputs when the predefined condition is met; and
transmit the user location to the second vehicle.

8. The first vehicle of claim 1, wherein the detection unit is further configured to determine location of a user device associated with the user relative to the first vehicle, and wherein the processor is further configured to:
determine a user location in a geographical area comprising the first vehicle based on the location of the user device associated with the user relative to the vehicle when the predefined condition is met; and transmit the user location to a plurality of vehicles located in the geographical area.

9. The first vehicle of claim 8, wherein the processor is further configured to transmit the user location to a server.

10. The first vehicle of claim 1, wherein the processor is further configured to:

determine a count of additional users exiting the first vehicle based on the inputs obtained from the detection unit;

determine that each additional user has exited the virtual zone based on the inputs obtained from the detection unit and the count; and deactivate transmission of the information associated with the virtual zone to the second vehicle responsive to determining that each additional user has exited the virtual zone.

11. The first vehicle of claim 1, wherein the information associated with the virtual zone further comprises the digital map.

12. The first vehicle of claim 11, wherein the information associated with the virtual zone causes the second vehicle to display the digital map overlaid with a representation of the virtual zone.

13. A method for monitoring a user associated with a first vehicle, the method comprising:

obtaining, by a processor, inputs from a detection unit, wherein the detection unit is configured to detect a presence of the user in the first vehicle and in proximity to the first vehicle;

determining, by the processor, that a predefined condition is met based on the inputs;

obtaining a digital map of an area around and including the vehicle;

generating, by the processor based on the digital map, a virtual zone around the first vehicle responsive to determining that the predefined condition is met; and transmitting, by the processor, information associated with the virtual zone to a second vehicle responsive to generating the virtual zone, wherein the information associated with the virtual zone includes a shape and dimension of the virtual zone and an expiration time duration associated with the virtual zone.

14. The method of claim 13, wherein the detection unit comprises interior and exterior vehicle cameras.

15. The method of claim 14, wherein the inputs comprise user images captured by the interior and exterior vehicle cameras.

16. The method of claim 13, wherein the predefined condition is met when the user exits the first vehicle.

17. The method of claim 13 further comprising:

determining that the user has travelled a predefined distance away from the first vehicle based on the inputs; and deactivating transmission of the information associated with the virtual zone to the second vehicle responsive to determining that the user has travelled the predefined distance away from the first vehicle.

18. The method of claim 17, wherein determining that the user has travelled the predefined distance away from the first vehicle comprises determining that the user has exited the virtual zone.

19. The method of claim 13, further comprising sending the digital map to the second vehicle.

20. A non-transitory computer-readable storage medium having instructions stored thereupon which, when executed by a processor, cause the processor to:

obtain inputs from a detection unit of a first vehicle, wherein the detection unit is configured to detect a presence of a user in the first vehicle and in proximity to the first vehicle;

determine that a predefined condition is met based on the inputs;

obtain a digital map of an area around and including the vehicle;

generate, based on the digital map, a virtual zone around the first vehicle responsive to determining that the predefined condition is met; and transmit information associated with the virtual zone to a second vehicle responsive to generating the virtual zone, wherein the information associated with the virtual zone includes a shape and dimension of the virtual zone and an expiration time duration associated with the virtual zone.

* * * * *